Patented Feb. 23, 1926.

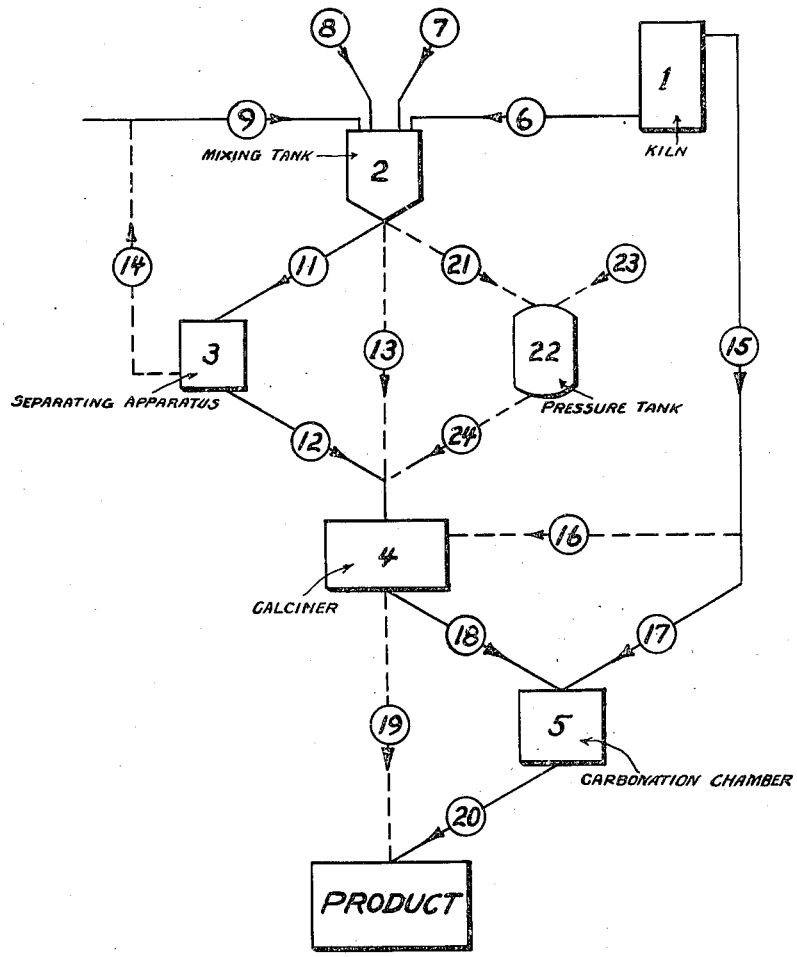

1,574,380

UNITED STATES PATENT OFFICE.

HERBERT A. ENDRES, OF LOMPOC, CALIFORNIA, ASSIGNOR TO THE CELITE COMPANY, OF LOS ANGELES, CALIFORNIA, A CORPORATION OF DELAWARE.

ARTICLE OF MANUFACTURE AND PROCESS OF MAKING SAME.

Application filed June 23, 1925. Serial No. 39,142.

*To all whom it may concern:*

Be it known that I, HERBERT A. ENDRES, a citizen of the United States, residing at Lompoc, county of Santa Barbara, State of California, have invented a new and useful Article of Manufacture and Process of Making Same, of which the following is a specification.

This invention relates to the process of manufacturing a finely divided material having a large surface area, by chemical disintegration rather than by grinding or milling. The product made in accordance with this invention is particularly adapted for use in filtration, de-emulsification, thermal insulation, an ingredient in concrete and cements, a carrier for catalytic agents and as a filler in numerous compounds such as rubber, phenol-condensation products, polishes, etc., wherever a fine porous product is needed.

It has been known for some time that lime and silica slowly react, and although steam under pressure accelerates the action slightly, the reaction takes a number of hours and even then is very incomplete. This combination of lime and silica has been used in the manufacture of sand-lime brick. I have found, however, that when a water suspension of a finely ground or powdered silica is treated with lime, at temperatures near the boiling point, a rapid reaction takes place, whereby a voluminous, almost gelatinous mass of hydrated monocalcium silicate is produced. By calcining the wet mass at a high temperature a very finely divided material is obtained.

Mechanical means of grinding or reducing the particles of solid materials are limited in their application to a product which will pass 250–325 mesh screens, but by means of my invention I can make a material which will have an average particle size of about one micron, (0.0000394 inch) or less, corresponding to a material of about 6000 mesh.

The finely divided silica used by me in the manufacture of a finely divided product may be pulverized sand or quartz, but preferably diatomaceous earth, otherwise known as infusorial earth, tripoli, diatomite, kieselguhr, or fossil flour. Some attempts have been made to pulverize crude diatomaceous earth to a fine state of division, but as has been said, mechanical means of disintegration have certain limitations as to minimum particle size obtainable. In my process I utilize certain chemical forces which make it possible to obtain a very much finer particle size.

My invention is disclosed on the accompanying diagrammatic flow chart. Whenever it is desirable to calcine limestone to make lime for my process, limestone is charged into the kiln or other suitable furnace (1) and the carbon dioxide gases utilized later on. The burned lime may be ground or otherwise reduced to the required state of division in any suitable apparatus (6) and then conveyed to a mixing tank or reaction chamber (2) which may be, for example, an open top tank, having means (9) of supplying cold or previously heated water thereto, means (7) of supplying heat, for example, by means of steam coils, and means (8) of supplying powdered silicious material thereto. The tank (2) should be provided with suitable agitating means.

At the completion of the reaction the resulting product may be conveyed as indicated by (11) to suitable dewatering or separating apparatus (3) which may consist of vacuum type filters or settling tanks. The dewatered product is then conveyed by means (12) to a calciner of suitable design (4). The effluent from the separating apparatus (3) may be returned by means (14) to the reaction chamber or allowed to go to waste. As an alternative method of procedure the product of the reaction chamber (2) may be conveyed as indicated by means (13) directly to the calciner (4).

As an additional variation in my process, tank (2) may be merely used as a mixing chamber and the mixed mass conveyed by means (21) to an autoclave or pressure tank (22) having suitable means of supplying steam (23) or heat thereto, wherein the reaction may take place at super-atmospheric pressure and temperatures in excess of 212° F. The product of such reaction is then conveyed by suitable means (24) to the calciner or roaster (4). Or the mixing operation in tank (2) may be eliminated and the lime, water and silicious material fed directly into the autoclave or pressure tank (22). This tank should be provided with appropriate agitating or mixing means so as to assure thorough mixing of the ingredients and prevent undue caking or agglomeration.

After calcination has taken place, the resulting finely divided material may be conveyed as indicated by (18) to a carbonation chamber (5) wherein it may be exposed to a large volume of air or other $CO_2$ bearing gases. The carbon dioxide resulting from the calcining operation at (1) may be conveyed by means (15) and (17) to this chamber. After carbonation the product is in finely divided condition and ready for commercial uses. As an alternative step in my process, the carbon dioxide gases resulting from the calcining operation at (1) may be conveyed by means (15) and (16) to the calciner (4) and the calcining and carbonating operations performed simultaneously.

Upon adding lime to the water suspension of diatomaceous earth the reaction takes place quickly, but becomes very violent at temperatures around 212° F., and after boiling for a period of 1½ hours, no diatomaceous structure is visible in the mass. The silicate which is formed is highly hydrated, becomes very bulky and water must be added from time to time as the reaction proceeds, to compensate for loss by evaporation and prevent a stiff mass from forming. The exact composition of the product of this reaction is not definitely known, although it appears that a calcium silicate having the composition $CaO.SiO_2.2½H_2O$ is formed in large amounts.

When this highly hydrated calcium silicate is dehydrated by calcination at temperatures ranging from 1000° to 1600° F. a pulverulent, impalpable material is obtained, having a particle size varying somewhat with the amount of lime used during the reaction, the amount of water added, and the temperature of calcination. Samples have been prepared in which the average particle size was essentially below one micron but much coarser grades can be prepared by longer heating of the mass, reducing the quantity of lime used, etc. When an excess of lime is used, particle size becomes smaller, probably due to a more complete and rapid combination of the comminuted silica and the lime and consequently a more complete dissociation during calcination. The product resulting from such calcination consists essentially of calcium metasilicate.

Whenever more lime than is theoretically needed to form the silicate had been added, the product contains some finely divided anhydrous lime (CaO). If the calcination is carried out below 1500° F. in the presence of carbon dioxide ($CO_2$) the excess lime present forms minute particles of calcium carbonate so that the final product is a mixture of calcium metasilicate and calcium carbonate. The material which may be manufactured by my process may therefore contain any predetermined amount of $CaCO_3$ or none, depending upon the proportional amounts of lime used.

The calcination of the reaction mixture differs from slow drying in that it thoroughly dehydrates the mass, stops crystal growth by rapidly removing the water which is the medium, or vehicle through which the growth takes place and prevents the agglomeration and coalescence which usually occurs when finely divided precipitated materials are slowly dried. The action obtained during calcination is probably similar to what would occur if a sealed light glass bulb partly filled with water was suddenly exposed to a high temperature. The water vaporizes rapidly and disrupts the particles, breaking them up into various fine segments.

One specific method of procedure in the operation of my process is as follows: 60 pounds of finely divided diatomaceous earth or other finely ground silicious material are dispersed in 500 pounds of water and the mixture heated to boiling. About 56 pounds of freshly burned quick lime are then gradually added with constant agitation and more water is added from time to time as the reaction takes place, until a total of 500 pounds of additional water are added. The mixture is then boiled for three hours with constant agitation to prevent baking on the bottom of the container and the voluminous, highly hydrated mass is then partially dehydrated or freed from excess entrained moisture on a suction filter. The still wet mass is then fed to a furnace operating at from 1000 to 1600° F. where all water of hydration is driven off and mass reduced to a very fine state of division. Calcination at 1400° for about half an hour gives very good results.

It is preferable to use excess quantities of lime as this increases the speed of reaction in the heating and boiling chamber and by reducing the time of reaction necessary, prevents the growth of large crystals of $CaO.SiO_3.2½H_2O$, the large crystals being detrimental to the production of a final product of fine division. Theoretically only 56 parts of lime are required to react with 60 parts of silica to form $CaSiO_3$ but I have used larger quantities, for example, 112 parts lime and obtained a product composed of almost equal parts of $CaSiO_3$ and $CaCO_3$.

One of the methods of operating my process, when the latter equivalent amounts are used, is as follows: Crude limestone is burned at a temperature about 1500° F. and the quicklime added to a boiling suspension of diatomaceous earth in water in the approximate proportions of 112 pounds lime to 60 pounds of diatomaceous earth. After keeping the mixture at about 212° F. for a sufficient length of time to assure the combination of all silica with the lime the mass is partly freed from mechanically held water in a suitable type of filter or de-waterer, as for example, a continuous suction filter or settling tank, and is then charged to a suitable furnace or oven where it is subjected to a temperature of from 1000 to 1500° F. The carbonation of the CaO produced in calcining the hydrated mass may be accomplished either in the furnace by performing such calcination in an atmosphere of $CO_2$ or after calcination the product may be subjected to the action of $CO_2$ or the carbonation may comprise both methods. The $CO_2$ may be easily obtained as a by product from the limestone-calcining operation and used in the carbonation of the final calcined product.

The reaction produced by mixing lime with a boiling suspension of diatomaceous earth in water is so violent that I have found it advisable to dilute the suspension with large amounts of water in order to prevent spattering and loss. As has been said before, the crystal growth is retarded and a finer product is obtainable from concentrated suspensions and for this reason I have found that the following alternative method of procedure may be adopted very successfully.

An autoclave or closed steam heated tank is filled with a suspension of 120 lbs. of finely divided diatomaceous earth in 750 lbs. of water and 224 lbs. of lime dispersed in an additional 750 lbs. of water is mixed therewith, the entire mixture is then kept heated for about 45 minutes at 15 lbs. pressure, 250° F., and at the end of this time, or when reaction is completed, the mass is removed from the autoclave and calcined and carbonated as described above By means of the above alternative method of operation no water is lost by evaporation, the reaction takes place much more rapidly, it is not necessary to remove excess water by filtration before the calcining operation, and as the reaction takes place rapidly, it is possible to make a very fine product. The ingredients may be fed directly to the autoclave, or preferably, to a mixer and then to the autoclave, so that one mixer can supply material for a number of the latter units.

By employing a suitable excess of lime (about three equivalents on the amount of diatomaceous earth or silica depending upon the activity of the lime) and a sufficiently finely divided diatomaceous earth or silica, the heat of hydration of the lime can be utilized in carrying out the reaction, no further application of heat being necessary after the lime has been added to the hot suspension of diatomaceous earth or silica. The product of this reaction is then calcined or it may be calcined and then carbonated as described.

The product produced in accordance with my invention may be used as a filler in paints, dental powders and pastes, soaps, polishes and various other compositions. The fine state of division of my final product gives a material having great surface area and for this reason it may be very effectively used as a carrier for catalytic agents as for nickle, for example in the hydrogenation process. It may also be very effectively utilized as an absorbent for gases, moisture or other liquids and malodorous substances. The product may be used to great advantage in the manufacture of rubber goods, such as tires, treads, containers, etc. and as a lubricant and water tightening agent for concretes or hydraulic cement compositions.

What I claim is:

1. The process of producing a finely divided material comprising heating a mixture of a finely divided silica and lime in water, and then calcining the resulting product.

2. The process of producing a finely divided material comprising heating a mixture of diatomaceous earth and lime in water, and then calcining the resulting product.

3. The process of producing a finely divided material comprising mixing lime with a water suspension of finely divided silica, heating such mixture to the boiling point until reaction occurs, and then calcining the product of such reaction.

4. The process of producing a finely divided material, comprising mixing lime with a water suspension of disintegrated diatomaceous earth, heating such mixture to the boiling point until reaction occurs and then calcining the product of such reaction.

5. The process of making a finely divided material comprising mixing lime with diatomaceous earth, adding water to the mixture, aplying heat thereto until reaction occurs, removing the excess water from the product of such reaction and then calcining the partly dried product.

6. The process of making a finely divided material, comprising mixing lime with diatomaceous earth, adding water to the mixture, applying heat thereto until reaction occurs, removing the excess water from the product of such reaction, calcining the partly dried product, and exposing the calcined product to the action of carbon dioxide.

7. The process of producing a finely divided material comprising mixing lime with finely divided silica in the presence of water, maintainng such mxture at about the temperature of boiling water until reaction occurs and then calcining the product of such reaction at a temperature of from 1000 to 1600° F.

8. The process of making a new article of manufacture comprising mixing lime with disintegrated diatomaceous earth in the presence of water, maintaining such mixture at about the boiling point until reaction occurs, calcining the product of such reaction at a temperature of from 1000 to 1600° F. and carbonating the product of such calcination.

9. The process of making a new article of manufacture comprising mixing lime with disintegrated diatomaceous earth in the presence of water, maintaining such mixture at about the boiling point until reaction occurs, removing the excess water from the product of such reaction and then calcining the partly dried product at a temperature of from 1000 to 1600° F. and carbonating the product of such calcination.

10. The process of making a finely divided material, comprising mixing lime with diatomaceous earth, adding water to the mixture, applying heat thereto until reaction occurs, removing the excess water from the product of such reaction, and subjecting the product to the action of carbon dioxide.

11. A new article of manufacture produced by mixing disintegrated diatomaceous earth with sufficient lime to combine therewith, producing a reaction by heating the mixture in the presence of water and subjecting the product to the action of carbon dioxide.

12. A new article of manufacture produced by mixing approximately 60 parts of disintegrated diatomaceous earth with 112 parts of lime by weight, causing a reaction by the addition of water and the application of heat and carbonating the product of such reaction.

13. As a new article of manufacture, a finely divided material resulting from the calcination of the product of reaction of lime and finely divided silica in the presence of water.

14. As a new article of manufacture, a finely divided material as set forth in claim 13, carbonated during calcination.

15. A finely divided product obtained by calcination of the product of a reaction of lime and diatomaceous earth in the presence of water.

16. As an article of manufacture a finely divided product as set forth in claim 15, carbonated during calcination.

17. A new article of manufacture produced by mixing approximately 60 parts of disintegrated diatomaceous earth with 112 parts of lime by weight, causing a reaction by the addition of water and the application of heat and calcination of the product of such reaction.

18. A new article of manufacture as set forth in claim 17, carbonated during the calcining operation.

19. The process of making a new article of manufacture comprising maintaining a hot mixture of finely divided silica, lime and water until reaction occurs, then removing the excess water from the product of such reaction and finally calcining the partly dried product.

In testimony whereof I have hereunto subscribed my name this 16th day of June, 1925.

HERBERT A. ENDRES.